(12) United States Patent
Yang et al.

(10) Patent No.: US 10,523,057 B2
(45) Date of Patent: Dec. 31, 2019

(54) WIRELESS CHARGING MODULE WITH VERSATILE CHARGING ORIENTATION AND MODULARIZED SENSING DEVICE THEREWITH

(71) Applicant: National Chung-Shan Institute of Science and Technology, Taoyuan (TW)

(72) Inventors: Po-Chun Yang, Taipei (TW); Chun-Liang Chu, Hualien County (TW); Yu-San Lin, Taoyuan (TW); Yu-Cheng Chang, Changhua County (TW)

(73) Assignee: National Chung-Shan Institute of Science and Technology, Taoyuan (TW)

(*) Notice: Subject to any disclaimer, the term of this patent is extended or adjusted under 35 U.S.C. 154(b) by 9 days.

(21) Appl. No.: 16/036,947

(22) Filed: Jul. 17, 2018

(65) Prior Publication Data
US 2019/0123585 A1    Apr. 25, 2019

(30) Foreign Application Priority Data
Oct. 20, 2017    (TW) .............................. 106136086 A

(51) Int. Cl.
*H02J 7/00*    (2006.01)
*H02J 50/12*    (2016.01)
*H02J 50/80*    (2016.01)
*H02J 50/90*    (2016.01)

(52) U.S. Cl.
CPC ............ *H02J 50/12* (2016.02); *H02J 7/0042* (2013.01); *H02J 7/0044* (2013.01); *H02J 50/80* (2016.02); *H02J 50/90* (2016.02)

(58) Field of Classification Search
CPC ........ H02J 7/025; H01F 38/14; Y02T 90/122; B60L 11/182
See application file for complete search history.

(56) References Cited

U.S. PATENT DOCUMENTS

| | | | |
|---|---|---|---|
| 7,211,986 B1* | 5/2007 | Flowerdew | H02J 7/025 320/108 |
| 2011/0006611 A1* | 1/2011 | Baarman | H01F 38/14 307/104 |
| 2015/0280442 A1* | 10/2015 | Graham | H02J 7/0042 307/31 |
| 2016/0118841 A1* | 4/2016 | Makwinski | H02J 50/10 320/108 |
| 2019/0081496 A1* | 3/2019 | Itagaki | H02J 7/0042 |

* cited by examiner

*Primary Examiner* — Arun C Williams
(74) *Attorney, Agent, or Firm* — Winston Hsu

(57) ABSTRACT

The present application provides a wireless charging module and a modularized sensing device therewith. A first charging unit is disposed around the inside of the wireless charging module for wirelessly charging a sensing module. Without introducing a transmission line as an electricity transmitting medium, the sensing module can be directly disposed inside and charged by the wireless charging module, which improves flexibility of implementation. Further, since the first charging unit is configured to surround the inside of the wireless charging module shaped as a bowl structure, the sensing module can be simply disposed into the bowl structure and wirelessly charged by the surrounding first charging units, which saves the inconvenience of setting the sensing module to a specific location or area for stable wireless charging and increases effective charging angles.

9 Claims, 1 Drawing Sheet

WIRELESS CHARGING MODULE WITH VERSATILE CHARGING ORIENTATION AND MODULARIZED SENSING DEVICE THEREWITH

BACKGROUND OF THE INVENTION

1. Field of the Invention

The invention relates to a wireless charging module and a sensing device therewith, and more particularly, to a wireless charging module with versatile charging orientation and a modularized sensing device therewith.

2. Description of the Prior Art

With the rapid progress of technology, various electronic devices have been launched which make everyone's life more convenient. Due to elevated requirement of home and environmental safety, various sensing devices for various purposes and demands are produced, such as video devices for capturing images, temperature sensing devices for sensing temperature variation, and contamination monitors for sensing pollution. Conventional sensing devices are not modularized with interchangeable sensing units when being designed and constructed, so the sensing units applied at large sites are usually integrated with equipment and equipment power source that is connected to the mains electricity by wire connection. Therefore, tedious work arises when it is needed to change the sensing units for evaluating other environmental indices or to relocate the sensing units to other locations.

Besides, conventional wireless charging base sold or used in the markets are usually implemented with built-in induction coils that are coiled on a particular plane and requires the charged portable electronic device to be set at a specific location precisely for being charged successfully, which is inconvenient for use. For this reason, some improvements have been developed to the conventional charging bases to incorporate multiple induction coils. However, the increased number and expanded range of induction coils also increase power consumption that fails to convert into power supply for a portable electronic device, and the wireless charging device still requires the charged portable electronic device to be set in a specific induction area precisely for stable induction connection with the wireless charging device.

SUMMARY OF THE INVENTION

Therefore, it is an objective of the present application to provide a wireless charging module and a modularized sensing device therewith to improve flexibility of sensing device implementation.

It is another objective of the present application to provide a wireless charging module and a modularized sensing device therewith where electricity transmission is achieved through a charging coil around the wireless charging module in form of a bowl structure so as to increase effective charging angles.

To achieve the aforementioned objectives, the present application discloses a wireless charging module electrically connected to a power supply and for wirelessly charging an electronic apparatus. The wireless charging module includes a main body, a first charging unit, and a first electrical connecting unit. An accommodating chamber is formed inside the main body. The first charging unit is disposed around the accommodating chamber and for wirelessly charging the electronic apparatus accommodated in the accommodating chamber. The first electrical connecting unit is disposed on a side of the main body and electrically connected with the first charging unit and the power supply and for transmitting electricity from the power supply to the first charging unit.

According to an embodiment of the present application, the first charging unit generates a magnetic field due to an electric current from the power supply, and an induced current for charging the electronic apparatus is induced in the electronic apparatus accommodated in the accommodating chamber via magnetic induction.

According to an embodiment of the present application, the wireless charging module further comprises a first magnetic unit for positioning the electronic apparatus within the accommodating chamber via magnetic attraction.

According to an embodiment of the present application, the main body is in a shape of a bowl structure or a barrel structure.

According to an embodiment of the present application, the first charging unit is a charging coil.

According to an embodiment of the present application, the power supply is an alternating current power supply, and first electrical connecting unit modulates a voltage of the electricity from the power supply and transmits the modulated electricity to the first charging unit.

According to an embodiment of the present application, the first charging unit wirelessly charges the electronic apparatus accommodated in the accommodating chamber in a non-contact manner.

To achieve the aforementioned objectives, the present application also discloses a modularized sensing device which includes an electricity transmitting module and a sensing module. The electricity transmitting module includes a main body, a first charging unit, and a first electrical connecting unit. An accommodating chamber is formed inside the main body. The first charging unit is disposed around the accommodating chamber. The first electrical connecting unit is disposed on a side of the main body and electrically connected with the first charging unit and the power supply and for transmitting electricity from the power supply to the first charging unit. The sensing module includes a housing, a second charging unit, a sensing unit, and a second electrical connecting unit. The second charging unit is disposed around a side of the housing. The second electrical connecting unit is electrically connected between the second charging unit and the sensing unit. The first charging unit wirelessly charges the second charging unit when the sensing module is accommodated in the accommodating chamber so as to provide the electricity to the sensing unit via the second electrical connecting unit.

According to an embodiment of the present application, the first charging unit generates a magnetic field due to an electric current from the power supply, an induced current is induced in the second charging unit via magnetic induction by the magnetic field generated by the first charging unit, and the induced current is transmitted to the sensing unit via the second electrical connecting unit.

According to an embodiment of the present application, the electricity transmitting module further comprises a first magnetic unit disposed inside the first electrical connecting unit, the sensing module further comprises a second magnetic unit disposed on the housing, and the sensing module is positioned in the electricity transmitting module via magnetic attraction between the first magnetic unit and the second magnetic unit.

According to an embodiment of the present application, the first charging unit and the second charging unit are charging coils.

According to an embodiment of the present application, the first main body is in a shape of a bowl structure or a barrel structure.

According to an embodiment of the present application, the sensing unit is an image sensor, a temperature sensor or a gas sensor.

According to an embodiment of the present application, the sensing module further comprises a signal transmitting unit electrically connected to the sensing unit and for transmitting a sensing result generated by the sensing unit to an external electronic device.

According to an embodiment of the present application, the power supply is an alternating current power supply, and first electrical connecting unit modulates a voltage of the electricity from the power supply and transmits the modulated electricity to the first charging unit.

According to an embodiment of the present application, the first charging unit wirelessly charges the second charging unit of the sensing module accommodated in the accommodating chamber in a non-contact manner.

In summary, the present application utilizes the first charging unit disposed around the inside of the main body of the wireless charging module for wirelessly charging an electronic apparatus. Therefore, without introducing a transmission line as an electricity transmitting medium for the electronic apparatus to be charged, the electronic apparatus can be directly disposed inside the main body and charged by the wireless charging module, which improves flexibility of implementation. Further, since the first charging units are configured to surround the inside of the main body shaped as a bowl structure, the electronic apparatus can be directly disposed into the bowl structure and wirelessly charged by the surrounding first charging units, which saves the inconvenience of setting the electronic apparatus to a specific location or area for stable wireless charging and increases effective charging angles.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. In the following discussion and claims, the system components are differentiated not by their names but by their function and structure differences. In the following discussion and claims, the terms "include" and "comprise" are used in an open-ended fashion and should be interpreted as "include but is not limited to". Also, the term "couple" or "link" is intended to mean either an indirect or a direct mechanical or electrical connection. Thus, if a first device is coupled or linked to a second device, that connection may be through a direct mechanical or electrical connection, or through an indirect mechanical or electrical connection via other devices and connections.

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure (s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
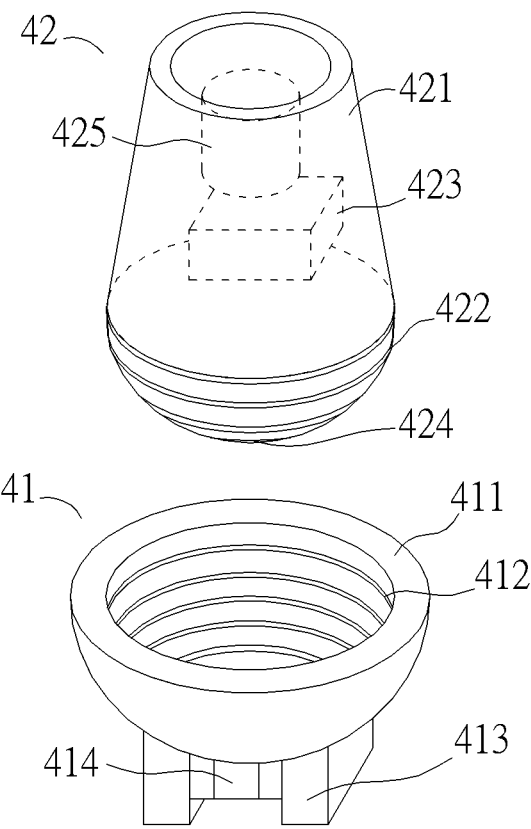
FIG. 1 is a diagram of a modularized sensing device according to an embodiment of the present application.

Please refer to FIG. 1. FIG. 1 is a diagram of a modularized sensing device 4 according to an embodiment of the present application. The present application utilizes modularization design to wirelessly charge an electronic device through an electricity transmitting module 41 connected to a power supply such as mains electricity, but is not limited to this. As shown in FIG. 1, the modularized sensing device 4 includes the electricity transmitting module 41 and the electronic apparatus, which is exemplified by a sensing module 42, but is not limited to this. The electricity transmitting module 41 includes a main body 411 with an accommodating chamber formed inside the main body 411, a first charging unit 412 disposed around the accommodating chamber, and a first electrical connecting unit 413 disposed on a side of the main body 411 and electrically connected with the first charging unit 412 and the power supply. Specifically, the first charging unit 412 can be around on an outside of the main body 411, around on an inside of the main body 412, or embedded around in the wall of the main body 412, and the description of the exemplary embodiments is intended to be illustrative and not to limit the scope of the invention. According to a preferred embodiment, the first electrical connecting unit 413 can be disposed on the side of the main body 411 opposite to the accommodating chamber, but is not limited to this. Besides, the sensing module 42 includes a housing 421, a second charging unit 422 disposed around a side of the housing 421, a sensing unit 425 disposed on a side of the housing 421 opposite to the second magnetic unit 424, and a second electrical connecting unit 423 disposed inside the housing 421 and electrically connected to the second charging unit 422 and the sensing unit 425. The sensing unit 425 can be, but is not limited to, an image sensor, a temperature sensor, or a gas sensor. In another embodiment of the present application, the sensing unit 425 can include a signal transmitting unit electrically connected to the sensing unit 425 and for transmitting a sensing result generated by the sensing unit 425 to an external electronic device, but is not limited to this. Besides, an end of the sensing module 42 can be in a shape of a hemisphere structure where the second charging unit 422 is disposed around, but not limited to this.

It should be noticed that the electricity transmitting module 41 can further include a first magnetic unit 414 for positioning the electronic apparatus or the sensing module 42 within the accommodating chamber via magnetic attraction. According to a preferred embodiment, the first magnetic unit 414 is disposed inside and combined with the first electrical connecting unit 413, but is not limited to this. The electronic apparatus or the sensing module 42 can further include a second magnetic unit 424 disposed on the housing 421, preferably is on a side of the housing 421 other than the side where the second charging unit 422 is. Therefore, the electronic apparatus or the sensing module 42 can be positioned in the electricity transmitting module 41 via magnetic attraction between the first magnetic unit 414 and the second magnetic unit 424. Besides, the power supply can be an alternating current power supply, and the first electrical connecting unit 413 can modulate a voltage of the electricity form the power supply and transmit the modulated electricity to the first charging unit 412. According to another preferred embodiment, the first charging unit 412 can wirelessly charge the electronic apparatus or the sensing module 42 accommodated in the accommodating chamber in a non-contact manner which can be magnetic induction, magnetic resonance, radio wave, or microwave, and the description of the exemplary embodiments is intended to be illustrative and not to limit the scope of the invention. Further detail of the operational principle of the modularized sensing device 4 charged via magnetic induction is described in the following paragraph.

The first electrical connecting unit 413 is electrically connected to the power supply and the first charging unit 412, modulates a voltage from the power supply, and provides the first charging unit 412 with an electric current from the power supply. The first charging unit 412 and the second charging unit 422 can be charging coils, respectively. Therefore, the first charging unit 412 generates a magnetic field due to the electric current. When the sensing module 42 is disposed inside the main body 411, the sensing module 42 is positioned to the electricity transmitting module 41 via attraction between the first magnetic unit 414 and the second magnetic unit 424. Since the second charging unit 422 also can be a charging coil, the first charging unit 412 and the second charging unit 422 are coupled through the magnetic induction between the charging coils other than by physical connection. An induced current is induced in the second charging unit 422 via the magnetic induction due to variation of the magnetic field of the first charging unit 412, and the induced current is provided as power supply through the second electrical connecting unit 423 to the sensing unit 425. Therefore, the present application achieves the purpose of providing the electronic apparatus with power supply through an electrical connection other than by physical contact.

Figure 2:
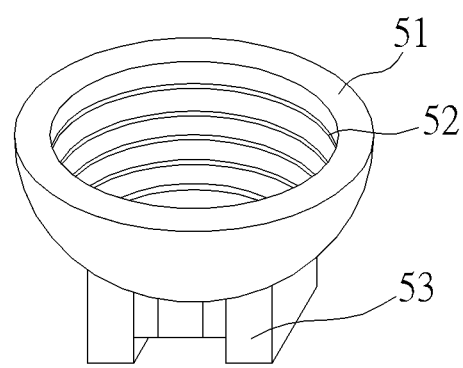
FIG. 2 is a diagram of a wireless charging module according to the embodiment of the present application.

Please refer to FIG. 2. FIG. 2 is a diagram of a wireless charging module 5 according to the embodiment of the present application. As shown in FIG. 2, the wireless charging module 5 includes a main body 51, a plurality of the first charging units 52 and an electrical connecting unit 53. The main body 51 can be in a shape of a bowl structure where a concave of the bowl structure defines an accommodating chamber. The first charging units 52 are disposed around an inside of the bowl structure. The electrical connecting unit 53 is disposed on the side of the main body 51 opposite to the accommodating chamber and electrically connected with a power supply. An electronic device accommodated in the accommodating chamber can be wirelessly charged by the first charging units 52. The electronic apparatus can be, but is not limited to, a computer electronic device, a communication electronic device, a consumer electronic device, a portable electronic device, or a portable imaging device. In another embodiment, the main body 51 of the wireless charging module 5 can be in a shape of a barrel structure or any shape of a structure with expanded accommodating space for accommodating the electronic apparatus, but is not limited to this.

In summary, the present application utilizes the first charging unit disposed around the inside of the main body of the wireless charging module for wirelessly charging an electronic apparatus. Therefore, without introducing a transmission line as an electricity transmitting medium for the electronic apparatus to be charged, the electronic apparatus can be directly disposed inside the main body and charged by the wireless charging module, which improves flexibility of implementation. Further, since the first charging units are configured to surround the inside of the main body shaped as a bowl structure, the electronic apparatus can be directly disposed into the bowl structure and wirelessly charged by the surrounding first charging units, which saves the inconvenience of setting the electronic apparatus to a specific location or area for stable wireless charging and increases effective charging angles.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A modularized sensing device comprising:
an electricity transmitting module comprising:
a main body, an accommodating chamber being formed inside the main body;
a first charging unit disposed around the accommodating chamber; and
a first electrical connecting unit disposed on a side of the main body and electrically connected with the first charging unit and a power supply and for transmitting electricity from the power supply to the first charging unit; and
a sensing module comprising:
a housing;
a second charging unit disposed around a side of the housing;
a sensing unit; and
a second electrical connecting unit electrically connected between the second charging unit and the sensing unit;
wherein the first charging unit wirelessly charges the second charging unit when the sensing module is accommodated in the accommodating chamber so as to provide the electricity to the sensing unit via the second electrical connecting unit.

2. The modularized sensing device of claim 1, wherein the first charging unit generates a magnetic field due to an electric current from the power supply, an induced current is induced in the second charging unit via magnetic induction by the magnetic field generated by the first charging unit, and the induced current is transmitted to the sensing unit via the second electrical connecting unit.

3. The modularized sensing device of claim 1, wherein the electricity transmitting module further comprises a first magnetic unit disposed inside the first electrical connecting unit, the sensing module further comprises a second magnetic unit disposed on the housing, and the sensing module is positioned in the electricity transmitting module via magnetic attraction between the first magnetic unit and the second magnetic unit.

4. The modularized sensing device of claim 1, wherein the first charging unit and the second charging unit are charging coils.

5. The modularized sensing device of claim 1, wherein the first main body is in a shape of a bowl structure or a barrel structure.

6. The modularized sensing device of claim 1, wherein the sensing unit is an image sensor, a temperature sensor or a gas sensor.

7. The modularized sensing device of claim 1, wherein the sensing module further comprises a signal transmitting unit electrically connected to the sensing unit and for transmitting a sensing result generated by the sensing unit to an external electronic device.

8. The modularized sensing device of claim 1, wherein the power supply is an alternating current power supply, and first electrical connecting unit modulates a voltage of the electricity from the power supply and transmits the modulated electricity to the first charging unit.

9. The modularized sensing device of claim 1, wherein the first charging unit wirelessly charges the second charging unit of the sensing module accommodated in the accommodating chamber in a non-contact manner.

* * * * *